US008883900B2

(12) United States Patent
Jiang et al.

(10) Patent No.: US 8,883,900 B2
(45) Date of Patent: Nov. 11, 2014

(54) ELECTROLESS PLATING PERFORMANCE OF LASER DIRECT STRUCTURING MATERIALS

(75) Inventors: Siguang Jiang, Shanghai (CN); Jiru Meng, Shanghai (CN); Xiangping (David) Zou, Shanghai (CN)

(73) Assignee: Sabic Global Technologies B.V. (NL)

( * ) Notice: Subject to any disclaimer, the term of this patent is extended or adjusted under 35 U.S.C. 154(b) by 184 days.

(21) Appl. No.: 13/280,846

(22) Filed: Oct. 25, 2011

(65) Prior Publication Data

US 2012/0279764 A1 Nov. 8, 2012

Related U.S. Application Data

(60) Provisional application No. 61/406,303, filed on Oct. 25, 2010.

(51) Int. Cl.
C08K 3/18 (2006.01)
C08K 3/22 (2006.01)

(52) U.S. Cl.
CPC ........................................ C08K 3/22 (2013.01)
USPC ........... 524/413; 174/255; 427/555; 524/502; 524/426; 524/423; 524/417

(58) Field of Classification Search
CPC ........................................................ C08K 3/22
USPC .................................................... 524/413
See application file for complete search history.

(56) References Cited

U.S. PATENT DOCUMENTS

| | | | |
|---|---|---|---|
| 4,603,166 A | 7/1986 | Poppe et al. | |
| 4,617,342 A | 10/1986 | Poppe et al. | |
| 5,053,440 A | 10/1991 | Schueler et al. | |
| 5,374,675 A * | 12/1994 | Plachetta et al. | 524/403 |
| 5,489,639 A | 2/1996 | Faber et al. | |
| 5,630,979 A | 5/1997 | Welz et al. | |
| 6,207,344 B1 | 3/2001 | Ramlow et al. | |
| 6,313,436 B1 | 11/2001 | Harrison | |
| 6,706,785 B1 | 3/2004 | Fu | |
| 7,060,421 B2 | 6/2006 | Naundorf et al. | |
| 7,105,223 B2 | 9/2006 | Kliesch et al. | |
| 7,728,048 B2 | 6/2010 | Labrec | |
| 2002/0107305 A1 | 8/2002 | Edler | |
| 2004/0013969 A1 | 1/2004 | Delp et al. | |
| 2006/0092079 A1 | 5/2006 | de Rochemont | |
| 2006/0141391 A1 | 6/2006 | Klein et al. | |
| 2007/0032569 A1 | 2/2007 | Langdon et al. | |
| 2008/0095992 A1 | 4/2008 | Hirschfelder et al. | |
| 2008/0280064 A1 | 11/2008 | Tokunaga et al. | |
| 2009/0048373 A1 * | 2/2009 | Clauss et al. | 524/86 |
| 2009/0292048 A1 | 11/2009 | Li et al. | |
| 2009/0292051 A1 | 11/2009 | Li et al. | |
| 2010/0021842 A1 | 1/2010 | Kanga | |
| 2010/0140571 A1 | 6/2010 | Scheuer et al. | |

FOREIGN PATENT DOCUMENTS

| | | |
|---|---|---|
| CN | 1326435 C | 7/2007 |
| EP | 0121985 B1 | 8/1988 |
| EP | 0121984 B1 | 1/1989 |
| EP | 0121983 B1 | 6/1989 |
| EP | 0122688 B1 | 9/1989 |
| EP | 0395414 B1 | 8/1995 |
| EP | 0867466 A1 | 9/1998 |
| EP | 2052032 | 6/2011 |
| EP | 2390282 A1 | 11/2011 |
| JP | 2001071645 A | 3/2001 |
| WO | 2004045857 A2 | 6/2004 |
| WO | 2008002980 A2 | 1/2008 |
| WO | 2009024496 | 2/2009 |
| WO | 2011085584 A1 | 7/2011 |
| WO | 2012126831 A1 | 9/2012 |

OTHER PUBLICATIONS

PCT International Search Report for International Application No. PCT/IB2011/054716.
Huske, M. et al.; "Laser supported activation and additive metallization of thermoplactics for 3D-MIDS" Proceedings of the 3rd Lane, Mar. 28, 2001, pp. 1-12.
Macary, R. L et al.; "SelectConnect (TM) process for metallizing circuits on molded parts and componets" Metal Finishing, Elsevier, vol. 108, No. 3, Mar. 1, 2010, pp. 35-37.
Written Opinion of the International Searching Authority, International Application No. PCT/IB2011/054716, International Filing Date: Oct. 21, 2011, Date of Mailing: Feb. 21, 2012, 7 pgs.
Written Opinion of the International Searching Authority, International Application No. PCT/IB2011/054786, Internation Filing Date: Oct. 26, 2011, Date of Mailing: Jan. 26, 2012, 10 pgs.
International Search Report, International Application No. PCT/IB2011/054786, International Filing Date: Oct. 26, 2011, Date of Mailing: Jan. 26, 2012, 5 pgs.
Rosenberger, S. et al. ; "Kunststoffe und Pigmentierungen fur das Beschriften und Schweissen mit Laser" Internet Citation; Sep. 28, 2005, pp. 1-34, Retrived on May 24, 2011 from: http://www.wolf-produktionssysteme.de/veroeffentlichungen/technolofieseminar05/vortrag2.pdf.

\* cited by examiner

*Primary Examiner* — Doris Lee
(74) *Attorney, Agent, or Firm* — Cantor Colburn LLP

(57) ABSTRACT

Thermoplastic compositions that are capable of being used in a laser direct structuring process to provide enhanced plating performance and good mechanical properties. The compositions of the present invention include a thermoplastic base resin, a laser direct structuring additive and a white pigment. The compositions can be used in a variety of applications such as personal computers, notebook and portable computers, cell phone antennas and other such communications equipment, medical applications, RFID applications, and automotive applications.

3 Claims, 2 Drawing Sheets

1　　　　　#2　　　　　#3

4　　　　#5　　　　#6　　　　#7

ELECTROLESS PLATING PERFORMANCE OF LASER DIRECT STRUCTURING MATERIALS

CROSS REFERENCE TO RELATED APPLICATIONS

The present application claims priority to U.S. Provisional Application No. 61/406,303, which was filed Oct. 25, 2010.

FIELD OF THE INVENTION

The present invention relates to thermoplastic compositions, and in particular to thermoplastic compositions capable of being used in a laser direct structuring process. The present invention also relates to methods of manufacturing these compositions and articles that include these compositions.

BACKGROUND OF THE INVENTION

Electrical components may be provided as molded injection devices (MID) with desired printed conductors, i.e., when manufactured in MID technology, using different methods, e.g., a masking method, in two-component injection molding with subsequent electroplating (or electroless plating), because for some cases, chemical plating is used for 2-component injection molding. In contrast to conventional circuit boards made of fiberglass-reinforced plastic or the like, MID components manufactured in this way are three-dimensional molded parts having an integrated printed conductor layout and possibly further electronic or electromechanical components. The use of MID components of this type, even if the components have only printed conductors and are used to replace conventional wiring inside an electrical or electronic device, saves space, allowing the relevant device to be made smaller, and lowers the manufacturing costs by reducing the number of assembly and contacting steps. These MID devices have great utility in cell phones, PDAs and notebook applications.

Stamp metal, flexible printed circuit board (FPCB) mounted and two-shot molding methods are three existing technologies to make an MID. However, stamping and FPCB mounted process have limitations in the pattern geometry, and the tooling is expensive and also altering of a RF pattern causes high-priced and time-consuming modifications into tooling. 2-shot-molding (two-component injection molding) processes have been used to produce 3D-MIDs with real three-dimensional structures. The antenna can be formed with subsequent chemical corrosion, chemical surface activation and selective metal coating. This method involves high initial costs and is only economically viable for large production numbers. 2-shot-molding is also not environmentally friendly process. All these three methods are tool-based technologies, which have limited flexibility, long development cycles, difficult prototype, expensive design changes, and limited miniaturization.

Accordingly, it is becoming increasingly popular to form MIDs using a laser direct structuring (LDS) process. In an LDS process a computer-controlled laser beam travels over the MID to activate the plastic surface at locations where the conductive path is to be situated. With a laser direct structuring process, it is possible to obtain small conductive path widths (such as of 150 microns or less). In addition, the spacing between the conductive paths may also be small. As a result, MIDs formed from this process save space and weight in the end-use applications. Another advantage of laser direct structuring is its flexibility. If the design of the circuit is changed, it is simply a matter of reprogramming the computer that controls the laser.

Currently, the additives for LDS materials are usually spinel based metal oxide such as copper chromium oxide, metal salts such as copper hydroxide phosphate, organic metal complex and the like. These LDS additives can be used in many resins, such as polycarbonate (PC), polycarbonate/acrylonitrile butadiene styrene (PC/ABS), polyphenylene oxide (PPO), nylon and the like to produced engineered plastic development compositions. However, currently the LDS additives are expensive, which increases the costs associated with using this technology.

Accordingly, it would be beneficial to provide a LDS composition having a good plating performance while utilizing less LDS additive thereby reducing the costs associated with the material. It would also be beneficial to provide a LDS material composition that is capable of being used in a wider array of applications due to the good performance and lower costs. It would also be beneficial to provide a thermoplastic composition that is capable of being used in a laser direct structuring process.

BRIEF SUMMARY OF THE INVENTION

The present invention provides a colorable thermoplastic composition capable of being used in a laser direct structuring process. The compositions of the present invention include a thermoplastic base resin, a laser direct structuring additive and a white pigment. The compositions can be used in a variety of applications such as personal computers, notebook and portable computers, cell phone antennas and other such communications equipment, medical applications, RFID applications, and automotive applications.

Accordingly, in one aspect, the present invention provides a thermoplastic composition including from 65 to 92% by weight of a thermoplastic base resin; from 0.5 to 20% by weight of a laser direct structuring additive; and from 0.5 to 15% by weight of at least one white pigment selected from TiO2 including anatise, rutile, coated and uncoated, ZnO, BaSO4, CaCO3, BaTiO3; wherein the thermoplastic compositions are capable of being plated after being activated using a laser.

In another aspect, the present invention provides a method of forming a thermoplastic composition including the step of blending in an extruder 65 to 92% by weight of a thermoplastic base resin; from 0.5 to 20% by weight of a laser direct structuring additive; and from 0.5 to 15% by weight of at least one pigment selected from TiO2 including anatise, rutile, coated and uncoated, ZnO, BaSO4, CaCO3, BaTiO3; wherein the thermoplastic compositions are capable of being plated after being activated using a laser.

In yet another aspect, the present invention provides a thermoplastic composition, consisting essentially of from 70 to 90% by weight of a thermoplastic base resin; from 1 to 10% by weight of a laser direct structuring additive selected from a heavy metal mixture oxide spinel, a copper salt, or a combination including at least one of the foregoing laser direct structuring additives; and from 1 to 10% by weight of at least one pigment selected from TiO2 including anatise, rutile, coated and uncoated, ZnO, BaSO4, CaCO3, BaTiO3 or a combination including at least one of the foregoing pigments; wherein the thermoplastic compositions are capable of being plated after being activated using a laser.

In still another aspect, the present invention provides an article of manufacture including a molded article having a conductive path thereon and a metal layer plated on the conductive path; wherein the metal layer has a thickness of 0.8 microns or higher as measured according to ASTM B568 and wherein the metal layer has a peel strength of 0.3 N/mm or higher as measured according to IPC-TM-650; further wherein the molded article is formed from a composition consisting essentially of from 65 to 92% by weight of a thermoplastic base resin; from 0.5 to 20% by weight of a laser direct structuring additive; and from 0.5 to 15% by weight of at least one pigment selected from TiO2 including anatise, rutile, coated and uncoated, ZnO, BaSO4, CaCO3, BaTiO3 or a combination including at least one of the foregoing pigments.

In yet another aspect, the present invention provides an article of manufacture that includes a molded article having a conductive path thereon and a copper layer plated on the conductive path; wherein the copper layer has a thickness of 0.8 microns or higher as measured according to ASTM B568 and wherein the metal layer has a peel strength of 0.3 N/mm or higher as measured according to IPC-TM-650; further wherein the molded article is formed from a composition consisting essentially of from 70 to 90% by weight of a thermoplastic base resin; from 1 to 10% by weight of a laser direct structuring additive selected from a heavy metal mixture oxide spinel, a copper salt, or a combination including at least one of the foregoing laser direct structuring additives; and from 1 to 10% by weight of at least one pigment selected from TiO2 including anatise, rutile, coated and uncoated, ZnO, BaSO4, CaCO3, BaTiO3 or a combination including at least one of the foregoing pigments.

In still another aspect, the present invention provides a method of forming an method of forming an article including the steps of molding an article from a composition; using a laser to form a conductive path on the molded article; and plating a copper layer onto the conductive path; wherein the copper layer has a thickness of 0.8 microns or higher as measured according to ASTM B568 and wherein the metal layer has a peel strength of 0.3 N/mm or higher as measured according to IPC-TM-650; further wherein the molded article is formed from a composition consisting essentially of from 70 to 90% by weight of a thermoplastic base resin; from 1 to 10% by weight of a laser direct structuring additive selected from a heavy metal mixture oxide spinel, a copper salt, or a combination including at least one of the foregoing laser direct structuring additives; and from 1 to 10% by weight of at least one pigment selected from TiO2 including anatise, rutile, coated and uncoated, ZnO, BaSO4, CaCO3, BaTiO3 or a combination including at least one of the foregoing pigments.

DETAILED DESCRIPTION OF THE INVENTION

Figure 1:
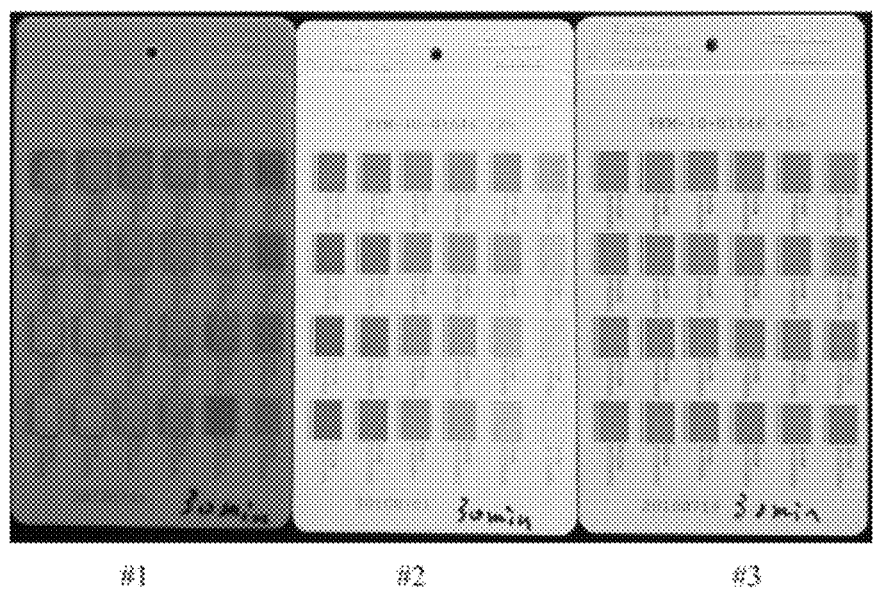
FIG. 1 shows examples of plating performance for compositions 1-3 in the Examples.

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of." All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

The present invention provides a more effective thermoplastic composition capable of being used in a laser direct structuring process. The compositions include a thermoplastic resin, a laser direct structuring additive and at least one pigment selected from TiO2 including anatise, rutile, coated and uncoated, ZnO, BaSO4, CaCO3 or BaTiO3. It has been found that the use of one or more of these pigments has a synergistic effect with the laser direct structuring additive in the LDS material formulation. This synergistic effect improves the metallization performance of LDS materials greatly, which improves the quality of the metal layer formed after electroless plating while using lower loading levels of the laser direct structuring additive. As a result, the compositions of the present invention provide excellent plating characteristics while also reducing the overall costs associated with forming the compositions.

Specifically, the present invention provides a new laser direct structuring composition and an article made from the composition that is then used in a laser direct structuring process. The process forms a conductive path on the article that is then plated with metal, such as copper. The compositions of the present invention utilize white pigments that enable copper layers to be plated onto the path formed during the laser direct structuring process that are 3 to 8 times thicker than copper layers plated onto paths in articles made without the white pigment in 30 minutes of electroless plating time. The white pigments have no negative impact on the peel strength, which can still maintain a high adhesion of plated copper layer to the articles. As such, the white pigments can improve the plating performance by accelerating the plating process and obtaining a thicker copper layer under the same plating conditions and plating times as with prior art materials. The white pigments also widen the plating process window to enable metallization quality using lower laser power. These results are unexpected simply by using a white pigment material.

Accordingly, in one aspect, the thermoplastic compositions of the present invention use a thermoplastic resin as the base for the composition. Examples of thermoplastic resins that may be used in the present invention include, but are not limited to, polycarbonate or a polycarbonate/acrylonitrile-butadiene-styrene resin blend; a poly(arylene ether) resin, such as a polyphenylene oxide resin a nylon-based resin, a polyphthalamide resin, a polyphenylene oxide resin or a combination including at least one of the foregoing resins.

Accordingly, in one embodiment, the thermoplastic composition used a polycarbonate-based resin. The polycarbonate-based resin may be selected from a polycarbonate or a resin blend that includes a polycarbonate. Accordingly, in one embodiment, polycarbonates may be used as the base resin in the composition. Polycarbonates including aromatic carbonate chain units include compositions having structural units of the formula (I):

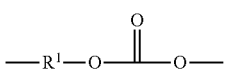
(1)

in which the $R^1$ groups are aromatic, aliphatic or alicyclic radicals. Beneficially, $R^1$ is an aromatic organic radical and, in an alternative embodiment, a radical of the formula (II):

$$-A^1-Y^1-A^2-  \qquad (II)$$

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, or the like. In another embodiment, zero atoms separate $A^1$ from $A^2$, with an illustrative example being bisphenol. The bridging radical $Y^1$ can be a hydrocarbon group or a saturated hydrocarbon group such as methylene, cyclohexylidene or isopropylidene.

Polycarbonates may be produced by the Schotten-Bauman interfacial reaction of the carbonate precursor with dihydroxy compounds. Typically, an aqueous base such as sodium hydroxide, potassium hydroxide, calcium hydroxide, or the like, is mixed with an organic, water immiscible solvent such as benzene, toluene, carbon disulfide, or dichloromethane, which contains the dihydroxy compound. A phase transfer agent is generally used to facilitate the reaction. Molecular weight regulators may be added either singly or in admixture to the reactant mixture. Branching agents, described forthwith may also be added singly or in admixture.

Polycarbonates can be produced by the interfacial reaction polymer precursors such as dihydroxy compounds in which only one atom separates $A^1$ and $A^2$. As used herein, the term "dihydroxy compound" includes, for example, bisphenol compounds having general formula (III) as follows:

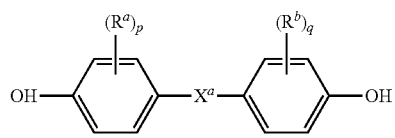
(III)

wherein $R^a$ and $R^b$ each independently represent hydrogen, a halogen atom, or a monovalent hydrocarbon group; p and q are each independently integers from 0 to 4; and $X^a$ represents one of the groups of formula (IV):

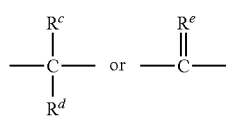
(IV)

wherein $R^c$ and $R^d$ each independently represent a hydrogen atom or a monovalent linear or cyclic hydrocarbon group, and $R^e$ is a divalent hydrocarbon group.

Examples of the types of bisphenol compounds that may be represented by formula (IV) include the bis(hydroxyaryl) alkane series such as, 1,1-bis(4-hydroxyphenyl)methane, 1,1-bis(4-hydroxyphenyl)ethane, 2,2-bis(4-hydroxyphenyl) propane (or bisphenol-A), 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, or the like; bis (hydroxyaryl)cycloalkane series such as, 1,1-bis(4-hydroxyphenyl)cyclopentane, 1,1-bis(4-hydroxyphenyl) cyclohexane, or the like, or combinations including at least one of the foregoing bisphenol compounds.

Other bisphenol compounds that may be represented by formula (III) include those where X is O, S, —SO— or —SO$_2$—. Some examples of such bisphenol compounds are bis(hydroxyaryl)ethers such as 4,4'-dihydroxy diphenylether, 4,4'-dihydroxy-3,3'-dimethylphenyl ether, or the like; bis(hydroxy diaryl)sulfides, such as 4,4'-dihydroxy diphenyl sulfide, 4,4'-dihydroxy-3,3'-dimethyl diphenyl sulfide, or the like; bis(hydroxy diaryl)sulfoxides, such as, 4,4'-dihydroxy diphenyl sulfoxides, 4,4'-dihydroxy-3,3'-dimethyl diphenyl sulfoxides, or the like; bis(hydroxy diaryl)sulfones, such as 4,4'-dihydroxy diphenyl sulfone, 4,4'-dihydroxy-3,3'-dimethyl diphenyl sulfone, or the like; or combinations including at least one of the foregoing bisphenol compounds.

Other bisphenol compounds that may be utilized in the polycondensation of polycarbonate are represented by the formula (V)

(V)

wherein, $R^f$, is a halogen atom of a hydrocarbon group having 1 to 10 carbon atoms or a halogen substituted hydrocarbon group; n is a value from 0 to 4. When n is at least 2, $R^f$ may be the same or different. Examples of bisphenol compounds that may be represented by the formula (IV), are resorcinol, substituted resorcinol compounds such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafloro resorcin, 2,3,4,6-tetrabromo resorcin, or the like; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, or the like; or combinations including at least one of the foregoing bisphenol compounds.

Bisphenol compounds such as 2,2,2',2'-tetrahydro-3,3,3', 3'-tetramethyl-1,1'-spirobi-[1H-indene]-6,6'-diol represented by the following formula (VI) may also be used.

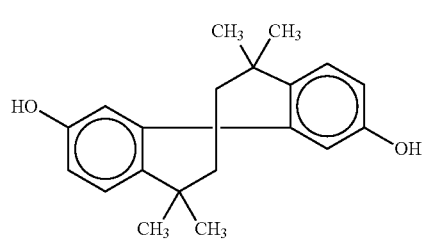
(VI)

In one embodiment, the bisphenol compound is bisphenol A.

Typical carbonate precursors include the carbonyl halides, for example carbonyl chloride (phosgene), and carbonyl bromide; the bis-haloformates, for example, the bis-haloformates of dihydric phenols such as bisphenol A, hydroquinone, or the like, and the bis-haloformates of glycols such as ethylene glycol and neopentyl glycol; and the diaryl carbonates, such as diphenyl carbonate, di(tolyl)carbonate, and di(naphthyl)carbonate. In one embodiment, the carbonate precursor for the interfacial reaction is carbonyl chloride.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is selected for use. Generally, useful aliphatic diacids have about 2 to about 40 carbons. A beneficial aliphatic diacid is dodecanedioic acid.

Branched polycarbonates, as well as blends of linear polycarbonate and a branched polycarbonate may also be used in the composition. The branched polycarbonates may be prepared by adding a branching agent during polymerization. These branching agents may include polyfunctional organic compounds containing at least three functional groups, which may be hydroxyl, carboxyl, carboxylic anhydride, haloformyl, and combinations including at least one of the foregoing branching agents. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) α,α-dimethyl benzyl) phenol), 4-chloroformyl phthalic anhydride, trimesic acid, benzophenone tetracarboxylic acid, or the like, or combinations including at least one of the foregoing branching agents. The branching agents may be added at a level of about 0.05 to about 2.0 weight percent (wt %), based upon the total weight of the polycarbonate in a given layer.

In one embodiment, the polycarbonate may be produced by a melt polycondensation reaction between a dihydroxy compound and a carbonic acid diester. Examples of the carbonic acid diesters that may be utilized to produce the polycarbonates are diphenyl carbonate, bis(2,4-dichlorophenyl)carbonate, bis(2,4,6-trichlorophenyl)carbonate, bis(2-cyanophenyl) carbonate, bis(o-nitrophenyl)carbonate, ditolyl carbonate, m-cresyl carbonate, dinaphthyl carbonate, bis(diphenyl)carbonate, bis(methylsalicyl)carbonate, diethyl carbonate, dimethyl carbonate, dibutyl carbonate, dicyclohexyl carbonate, or the like, or combinations including at least one of the foregoing carbonic acid diesters. In one embodiment, the carbonic acid diester is diphenyl carbonate or bis(methylsalicyl)carbonate.

Beneficially, the number average molecular weight of the polycarbonate is 3,000 to 1,000,000 grams/mole (g/mole). Within this range, it is beneficial to have a number average molecular weight of greater than or equal to 10,000 in one embodiment, greater than or equal to 20,000 in another embodiment, and greater than or equal to 25,000 g/mole in yet another embodiment. Also beneficial is a number average molecular weight of less than or equal to 100,000 in one embodiment, less than or equal to 75,000 in an alternative embodiment, less than or equal to 50,000 in still another alternative embodiment, and less than or equal to 35,000 g/mole in yet another alternative embodiment.

In another embodiment, the polycarbonate-based resin used in the thermoplastic composition includes a polycarbonate resin blend, such that a polycarbonate is blended with another resin. In one embodiment, the polycarbonate-based resin includes a blend of a polycarbonate with a polystyrene polymer. Examples include polycarbonate/acrylonitrile-butadiene-styrene resin blends. The term "polystyrene" as used herein includes polymers prepared by bulk, suspension and emulsion polymerization, which contain at least 25% by weight of polymer precursors having structural units derived from a monomer of the formula (VII):

(VII)

wherein $R^5$ is hydrogen, lower alkyl or halogen; $Z^1$ is vinyl, halogen or lower alkyl; and p is from 0 to about 5. These organic polymers include homopolymers of styrene, chlorostyrene and vinyltoluene, random copolymers of styrene with one or more monomers illustrated by acrylonitrile, butadiene, alpha-methylstyrene, ethylvinylbenzene, divinylbenzene and maleic anhydride, and rubber-modified polystyrenes including blends and grafts, wherein the rubber is a polybutadiene or a rubbery copolymer of about 98 to about 70 wt % styrene and about 2 to about 30 wt % diene monomer. Polystyrenes are miscible with polyphenylene ether in all proportions, and any such blend may contain polystyrene in amounts of about 5 to about 95 wt % and most often about 25 to about 75 wt %, based on the total weight of the polymers.

In an alternative embodiment, the thermoplastic compositions of the present invention include a nylon-based resin, such as a polyamide resin. Polyamides are generally derived from the polymerization of organic lactams having from 4 to 12 carbon atoms. In one embodiment, the lactams are represented by the formula (VIII)

(VIII)

wherein n is 3 to 11. In one embodiment, the lactam is epsilon-caprolactam having n equal to 5.

Polyamides may also be synthesized from amino acids having from 4 to 12 carbon atoms. In one embodiment, the amino acids are represented by the formula (IX)

(IX)

wherein n is 3 to 11. In one embodiment, the amino acid is epsilon-aminocaproic acid with n equal to 5.

Polyamides may also be polymerized from aliphatic dicarboxylic acids having from 4 to 12 carbon atoms and aliphatic diamines having from 2 to 12 carbon atoms. In one embodiment, the aliphatic diamines are represented by the formula (X)

(X)

wherein n is about 2 to about 12. In one embodiment, the aliphatic diamine is hexamethylenediamine ($H_2N(CH_2)_6NH_2$). In one embodiment, the molar ratio of the dicarboxylic acid to the diamine is from 0.66 to 1.5. Within this range it is generally beneficial to have the molar ratio be greater than or equal to 0.81. In another embodiment, the molar ratio is greater than or equal to 0.96. In yet another embodiment, the molar ratio is less than or equal to 1.22. In still another embodiment, the molar ratio is less than or equal to 1.04. Examples of polyamides that are useful in the present invention include, but are not limited to, nylon 6, nylon 6,6, nylon 4,6, nylon 6, 12, nylon 10, or the like, or combinations including at least one of the foregoing polyamides.

Synthesis of polyamideesters may also be accomplished from aliphatic lactones having from 4 to 12 carbon atoms and aliphatic lactams having from 4 to 12 carbon atoms. The ratio of aliphatic lactone to aliphatic lactam may vary widely depending on the selected composition of the final copolymer, as well as the relative reactivity of the lactone and the lactam. In one embodiment, the initial molar ratio of aliphatic lactam to aliphatic lactone is 0.5 to 4. Within this range a molar ratio of greater than or equal to about 1 is beneficial. In another embodiment, a molar ratio of less than or equal to 2 is utilized.

The conductive precursor composition may further include a catalyst or an initiator. Generally, any known catalyst or initiator suitable for the corresponding thermal polymerization may be used. Alternatively, the polymerization may be conducted without a catalyst or initiator. For example, in the synthesis of polyamides from aliphatic dicarboxylic acids and aliphatic diamines, no catalyst may be used in select embodiments.

For the synthesis of polyamides from lactams, suitable catalysts include water and the omega-amino acids corresponding to the ring-opened (hydrolyzed) lactam used in the synthesis. Other suitable catalysts include metallic aluminum alkylates ($MAl(OR)_3H$; wherein M is an alkali metal or alkaline earth metal, and R is $C_1$-$C_{12}$ alkyl), sodium dihydrobis (2-methoxyethoxy)aluminate, lithium dihydrobis(tert-butoxy)aluminate, aluminum alkylates ($Al(OR)_2R$; wherein R is $C_1$-$C_{12}$ alkyl), N-sodium caprolactam, magnesium chloride or bromide salt of epsilon-caprolactam ($MgXC_6H_{10}NO$, X=Br or Cl), dialkoxy aluminum hydride. Suitable initiators include isophthaloybiscaprolactam, N-acetalcaprolactam, isocyanate epsilon-caprolactam adducts, alcohols (ROH; wherein R is $C_1$-$C_{12}$ alkyl), diols (HO—R—OH; wherein R is R is $C_1$-$C_{12}$ alkylene), omega-aminocaproic acids, and sodium methoxide.

For the synthesis of polyamideesters from lactones and lactams, suitable catalysts include metal hydride compounds, such as a lithium aluminum hydride catalysts having the formula $LiAl(H)_x(R^1)_y$, where x is 1 to 4, y is 0 to 3, x+y is equal to 4, and $R^1$ is selected from the group consisting of $C_1$-$C_{12}$ alkyl and $C_1$-$C_{12}$ alkoxy; highly beneficial catalysts include $LiAl(H)(OR^2)_3$, wherein $R^2$ is selected from $C_1$-$C_8$ alkyl; an especially beneficial catalyst is $LiAl(H)(OC(CH_3)_3)_3$. Other suitable catalysts and initiators include those described above for the polymerization of poly(epsilon-caprolactam) and poly(epsilon-caprolactone).

In yet another embodiment, the thermoplastic compositions of the present invention include a poly(arylene ether) resin. As used herein, a "poly(arylene ether)" includes a plurality of structural units of the formula (XI):

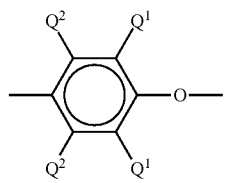

(XI)

wherein for each structural unit, each $Q^1$ is independently halogen, primary or secondary lower alkyl (e.g., an alkyl containing 1 to 7 carbon atoms), phenyl, haloalkyl, aminoalkyl, alkenylalkyl, alkynylalkyl, hydrocarbonoxy, and halohydrocarbonoxy wherein at least two carbon atoms separate the halogen and oxygen atoms; and each $Q^2$ is independently hydrogen, halogen, primary or secondary lower alkyl, phenyl, haloalkyl, aminoalkyl, alkenylalkyl, alkynylalkyl, hydrocarbonoxy, halohydrocarbonoxy wherein at least two carbon atoms separate the halogen and oxygen atoms. In some embodiments, each $Q^1$ is independently alkyl or phenyl, for example, $C_{1-4}$ alkyl, and each $Q^2$ is independently hydrogen or methyl. The poly(arylene ether) may include molecules having aminoalkyl-containing end group(s), typically located in an ortho position to the hydroxy group. Also frequently present are 4-hydroxybiphenyl end groups, typically obtained from reaction mixtures in which a by-product diphenoquinone is present.

The poly(arylene ether) may be in the form of a homopolymer; a copolymer; a graft copolymer; an ionomer; a block copolymer, for example comprising arylene ether units and blocks derived from alkenyl aromatic compounds; as well as combinations comprising at least one of the foregoing. Poly (arylene ether) includes polyphenylene ether containing 2,6-dimethyl-1,4-phenylene ether units optionally in combination with 2,3,6-trimethyl-1,4-phenylene ether units.

The poly(arylene ether) may be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

The poly(arylene ether) can have a number average molecular weight of 3,000 to 40,000 atomic mass units (amu) and a weight average molecular weight of 5,000 to 80,000 amu, as determined by gel permeation chromatography. The poly(arylene ether) can have an intrinsic viscosity of 0.10 to 0.60 deciliters per gram (dl/g), or, more specifically, 0.29 to 0.48 dl/g, as measured in chloroform at 25° C. It is possible to utilize a combination of high intrinsic viscosity poly(arylene ether) and a low intrinsic viscosity poly(arylene ether). Determining an exact ratio, when two intrinsic viscosities are used, will depend somewhat on the exact intrinsic viscosities of the poly(arylene ether) used and the ultimate physical properties that are selected.

Examples polyphenylene ether polymers that may be used in the present invention include, but are not limited to, poly (2,6-dimethyl-1,4-phenylene)ether; poly(2,3,6-trimethyl-1, 4-phenylene)ether; poly(2,6-diethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; poly(2,6-dilauryl-1,4-phenylene)ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene)

ether; poly(2-ethyl-6-staryloxy-1,4-phenylene)ether; poly (2,6-dichloro-1,4-phenylene)ether; poly(2-methyl-6-phenyl-1,4-phenylene)ether; poly(2,6-dibenzyl-1,4-phenylene) ether; poly(2-ethoxy-1,4-phenylene)ether; poly(2-chloro-1, 4-phenylene)ether; poly(2,6-dibromo-1,4-phenylene)ether; poly(3-bromo-2,6-dimethyl-1,4-phenylene)ether, copolymers thereof and mixtures thereof, and the like. In select embodiments, polyphenylene ether polymers for use in the compositions of the present invention include poly(2,6-dimethyl-1,4-phenylene)ether, poly(2,3,6-trimethyl-1,4-phenylene)ether, blends of these polymers and copolymers including units of 2,3,6-trimethyl-1,4-phenylene ether and units of 2,6-dimethyl-1,4-phenylene ether. Examples of such polymers and copolymers are also set forth in U.S. Pat. No. 4,806,297.

In yet another embodiment, the thermoplastic compositions of the present invention include a polyphthalamide resin. The polyphthalamide, in one embodiment, includes the reaction product of (i) hexamethylene diamine or a mixture of hexamethylene diamine and trimethyl hexamethylene diamine, and (ii) terephthalic acid, and optionally (iii) at least one acid selected from isophthalic acid or adipic acid, provided that a mixture of the diamines is employed if reactant (iii) is absent. These polyphthalamides are generally crystalline in nature and exhibit improved tensile strength and high heat deflection temperatures. These polyphthalamides, and methods for their preparation, are disclosed in U.S. Pat. Nos. 4,603,166 and 4,617,342, and in European Patent Applications Nos. 121, 983, 121, 984, 121, 985, 122, 688 and 395, 414.

For example, U.S. Pat. No. 4,603,166 and European Patent Application No. 121,984 disclose polyphthalamides prepared from hexamethylene diamine, terephthalic acid and adipic acid and from hexamethylene diamine, terephthalic acid, isophthalic acid and adipic acid. The hexamethylene diamine:terephthalic acid:isophthalic acid:adipic acid mole ratio employed therein is in the range of about 100:65-95:25-0:35-5. U.S. Pat. No. 4,617,342 and European Patent Application No. 122,688 disclose polyphthalamides formed from a mixture of hexamethylene diamine and trimethyl hexamethylene diamine in a molar ratio of from about 98:2 to about 60:4 and a mixture of terephthalic acid and isophthalic acid in a molar ratio of at least 80:20 to about 99:1. European Patent Application No. 121,985 discloses polyphthalamides prepared from a mixture of hexamethylene diamine and trimethyl hexamethylene diamine in a mole ratio of from about 55/45 to about 95/5 and terephthalic acid. The mole ratio of the terephthalic acid to the diamines is preferably in the range of 1.2:1 to 1:1.2, and more preferably about 1:1. European Patent Application No. 121,983 discloses polyphthalamides prepared from mixtures of hexamethylene diamine and trimethyl hexamethylene diamine and mixtures of terephthalic acid and adipic acid or mixtures of terephthalic acid, isophthalic acid and adipic acid. The mole ratio of hexamethylene diamine to trimethyl hexamethylene diamine is in the range of about 55/45 to about 98/2. When a mixture of terephthalic acid and adipic acid is employed, the mole ratio of the diamines, terephthalic acid and adipic acid is in the range of about 100/61/39 to 100/95/5. When the mixture of terephthalic acid, isophthalic acid and adipic acid is employed, the mole ratio of the diamines, terephthalic acid and a mixture of isophthalic acid and adipic acid is in the range of about 100/61/39 to 100/95/5, with the molar ratio of isophthalic acid to adipic acid in the mixture being about 38/1 to 1/38. Any of these crystalline polyphthalamides are suitable for use in the compositions of the present invention and may be prepared in accordance with the teachings of the aforementioned Poppe et al U.S. patents and the cited European patent applications.

The amount of the thermoplastic resin used in the thermoplastic compositions of the present invention may be based on the selected properties of the thermoplastic compositions as well as molded articles made from these compositions. Other factors include the type and/or amount of the LDS additive used and/or the type and/or amount of the pigment used. In one embodiment, the thermoplastic resin is present in amounts of from 60 to 97 wt. %. In another embodiment, the thermoplastic resin is present in amounts from 65 to 95 wt. %. In still another embodiment, the thermoplastic resin is present in amounts from 70 to 90 wt. %.

In addition to the thermoplastic resin, the compositions of the present invention also include a laser direct structuring (LDS) additive. The LDS additive is selected to enable the composition to be used in a laser direct structuring process. In an LDS process, a laser beam exposes the LDS additive to place it at the surface of the thermoplastic composition and to activate metal atoms from the LDS additive. As such, the LDS additive is selected such that, upon exposed to a laser beam, metal atoms are activated and exposed and in areas not exposed by the laser beam, no metal atoms are exposed. In addition, the LDS additive is selected such that, after being exposed to laser beam, the etching area is capable of being plated to form conductive structure. As used herein "capable of being plated" refers to a material wherein a substantially uniform metal plating layer can be plated on laser-etched area and show a wide window for laser parameters. This process is different than laser marking wherein the main outcome of laser marking is a color change in the material under the effect of energy radiation. And the key characterization for laser marking is the contrast between the mark and the substrate.

Conversely, for LDS, the goal is the formation of metal seeds on the laser etched surface, and the final metallization layer during the following plating process. Plating rate and adhesion of plated layers are the key evaluation requirements. However, as discussed, the present invention includes a white pigment in conjunction with the LDS to provide a synergistic effect on the plating performance, thereby enabling lower loadings of the LDS additive to be used while still maintaining excellent plating characteristics.

Examples of LDS additives useful in the present invention include, but are not limited to, a heavy metal mixture oxide spinel, such as copper chromium oxide spinel; a copper salt, such as copper hydroxide phosphate, copper phosphate, copper sulfate, cuprous thiocyanate; or a combination including at least one of the foregoing LDS additives.

The amount of the LDS additive included is sufficient to enable plating of the track formed after activation by the laser while not adversely affecting mechanical properties. In one embodiment, the LDS additive is present in amounts of from 0.5 to 20 wt. %. In another embodiment, the LDS additive is present in amounts from 1 to 15 wt. %. In still another embodiment, the LDS additive is present in amounts from 2 to 10 wt. %.

As discussed, the LDS additive is selected such that, after activating with a laser, the conductive path can be formed by followed a standard electroless plating process. When the LDS additive is exposed to the laser, elemental metal is released. The laser draws the circuit pattern onto the part and leaves behind a roughened surface containing embedded metal particles. These particles act as nuclei for the crystal growth during a subsequent plating process, such as a copper plating process. Other electroless plating processes that may be used include, but are not limited to, gold plating, nickel plating, silver plating, zinc plating, tin plating or the like.

In addition to the thermoplastic resin and the LDS additive, the compositions of the present invention optionally include a pigment. By using a pigment in the LDS additive, it has been found that the resulting compositions are still capable of providing excellent plating characteristics in an electroless plating process while using lower amounts of the LDS additive. Specifically, the compositions of the present invention utilize white pigments that enable metal layers to be plated onto the path formed during the laser direct structuring process that are thicker than metal layers plated onto paths in articles made without the pigment. The pigments have no negative impact on the peel strength, which can still maintain a high adhesion of plated layer to the articles. As such, the pigments can improve the plating performance by accelerating the plating process and obtaining a thicker metal layer under the same plating conditions and plating times as with prior art materials. The pigments also widen the plating process window to enable metallization quality using lower laser power.

Examples of pigments that may be used in the present invention include, but are not limited to, TiO2 including anatise, rutile, ZnO, BaSO4, CaCO3, BaTiO3 or a combination including at least one of the foregoing pigments. In one embodiment, the pigment is present in amounts of from 0.5 to 15 wt. %. In another embodiment, the pigment is present in amounts from 1 to 12 wt. %. In still another embodiment, the pigment is present in amounts from 2 to 10 wt. %. As discussed, these levels of pigments enable lower loadings of LDS additive to be utilized while maintaining good mechanical properties.

As discussed, the compositions of the present invention utilize a synergy between the pigment and the LDS additive to create compositions having enhanced plating performance and good mechanical properties. Articles made from the compositions of the present invention have metal layers that are 3 to 8 times thicker than metal layers plated onto paths in articles made without the pigment in 30 minutes of electroless plating time. In one embodiment, this results in peel strengths of 0.7 N/mm or higher. In an alternative embodiment, the metal layers have a peel strength of 0.8 N/mm or higher. The thickness of the metal layer is, in one embodiment, 0.8 microns or higher. In another embodiment, the thickness of the metal layer is 1.0 microns or higher In addition to the thermoplastic resin, the LDS additive and the pigment, the thermoplastic compositions of the present invention may include various additives ordinarily incorporated in resin compositions of this type. Mixtures of additives may be used. Such additives may be mixed at a suitable time during the mixing of the components for forming the composition. The one or more additives are included in the thermoplastic compositions to impart one or more selected characteristics to the thermoplastic compositions and any molded article made therefrom. Examples of additives that may be included in the present invention include, but are not limited to, heat stabilizers, process stabilizers, antioxidants, light stabilizers, plasticizers, antistatic agents, mold releasing agents, UV absorbers, lubricants, flow promoters, impact modifiers or a combination of one or more of the foregoing additives.

Suitable heat stabilizers include, for example, organo phosphites such as triphenyl phosphite, tris-(2,6-dimethylphenyl)phosphite, tris-(mixed mono- and di-nonylphenyl) phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Suitable antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

Suitable light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Suitable plasticizers include, for example, phthalic acid esters such as dioctyl-4,5-epoxy-hexahydrophthalate, tris-(octoxycarbonylethyl)isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Suitable antistatic agents include, for example, glycerol monostearate, sodium stearyl sulfonate, sodium dodecylbenzenesulfonate or the like, or combinations of the foregoing antistatic agents. In one embodiment, carbon fibers, carbon nanofibers, carbon nanotubes, carbon black, or any combination of the foregoing may be used in a polymeric resin containing chemical antistatic agents to render the composition electrostatically dissipative.

Suitable mold releasing agents include for example, metal stearate, stearyl stearate, pentaerythritol tetrastearate, beeswax, montan wax, paraffin wax, or the like, or combinations including at least one of the foregoing mold release agents.

Mold releasing agents are generally used in amounts of from 0.1 to 1.0 parts by weight, based on 100 parts by weight of the total composition, excluding any filler.

Suitable UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1, 3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl) oxy]-2,2-bis[[(2-cyano-3,3-diphenylacryloyl)oxy]methyl] propane (UVINUL™ 3030); 2,2'-(1,4-phenylene)bis(4H-3, 1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight based on 100 parts by weight of the total composition, excluding any filler.

Suitable lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Suitable blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

Additionally, materials to improve flow and other properties may be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

The thermoplastic compositions of the present invention may be formed using any known method of combining multiple components to form a thermoplastic resin. In one embodiment, the components are first blended in a high-speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. The extruder is generally operated at a temperature higher than that necessary to cause the composition to flow. The extrudate is immediately quenched in a water batch and pelletized. The pellets so prepared when cutting the extrudate may be one-fourth inch long or less as desired. Such pellets may be used for subsequent molding, shaping, or forming.

Shaped, formed, or molded articles including the thermoplastic compositions are also provided. The thermoplastic compositions can be molded into useful shaped articles by a variety of means such as injection molding, extrusion, rotational molding, blow molding and thermoforming to form articles such as, for example, housings for personal computers, notebook and portable computers, etc.; housings for cell phone and other such communications equipment; medical applications; RFID applications; automotive applications, and the like.

In one embodiment, the present invention includes a molded article having a conductive path onto which has been plated a metal layer. In one embodiment, the metal layer has a peel strength of 0.3 N/mm or higher. In another embodiment, the metal layer has a peel strength of 0.7 N/mm or higher. In still another embodiment, the metal layer has a peel strength of 0.8 N/mm or higher. In another aspect the metal layer has a thickness of 0.8 microns or higher in one embodiment. In another embodiment, the metal layer has a thickness of 1.0 microns or higher.

The present invention is further illustrated by the following non-limiting examples.

EXAMPLES

In these examples, the effects of a pigment in combination with an LDS additive on the platability and mechanical properties of a polymer composition were examined. In these examples, the polymer base resin was a polycarbonate/acrylonitrile-butadiene-styrene resin blend (available from SABIC Innovative Plastics) and the LDS additive was performed a copper hydroxide phosphate (available from Merck). The pigment was TiO2 (available from DuPont). 3.77 wt % of additional additives and fillers were used in all examples. The formulations used in these examples may be seen in Tables 1-3.

TABLE 1

| Compositions | Unit | #1 | #2 | #3 |
|---|---|---|---|---|
| PC | Wt % | 49 | 46 | 44 |
| ABS | Wt % | 43.23 | 40.23 | 38.23 |
| Copper hydroxide phosphate | Wt % | 4 | 0 | 4 |
| Other fillers + additive | Wt % | 3.77 | 3.77 | 3.77 |
| TiO2 | Wt % | 0 | 10 | 10 |
| Total Weight | Wt % | 100 | 100 | 100 |

Using the formulations shown in Table 1, the synergy of the TiO2 and an LDS additive in plating performance is shown as compared to examples containing only the LDS additive or only the pigment. In general, to determine the electroless plating capability of compositions, the compositions are tested by evaluating plated copper layer thickness, adhesion of copper layer to the base matrix, roughness of copper layer and the plating process window.

The plating process window was determined based on an evaluation of different combinations of laser structuring process parameters. These process parameters were laser power and laser frequency. In the examples, 4% of the LDS additive was used. The plating process window was examined by setting the laser power at 3 W, 4 W, 5 W, 6 W, 8 W and 10 W and the laser frequency was tested at 40 kHz, 60 kHz, 80 kHz and 100 kHz for laser etching (laser structuring). This resulted in 24 test runs for each formulation.

As may be seen from the test results, the compounds using only the TiO2 pigment, even using a loading as high as 10%, could not produce a conductor track structure (such as antenna application) by using LDS technology. In these examples, no metal layer (copper) could be deposited on any of the laser-etched areas using the abovementioned parameter combinations for compositions using Formulation 2 in Table 1, which indicated the process window was zero for this formulation.

However, the compounds with the copper hydroxide phosphate LDS additive alone (Formulation 1 in Table 1) could be used to produce conductor track structure using LDS technology. As may be seen in FIG. 1, except for the etched blocks in the lowest laser power condition (3 W) and the etched block of (4 W and 100 kHz), it was possible to deposit a good copper layer on the other laser etched blocks, which indicated that the process window of Formulation 1 was is much better than Formulation 2.

However, making compositions according to the concepts of the present invention, when both the TiO2 pigment and the copper hydroxide phosphate LDS additive were added in the compounds (Formulation 3 in Table 1), the result was a larger electroless plating process window than Formulation 1. As may be seen in FIG. 1, all the laser etched blocks could be plated except the block at the lowest power and highest frequency (3 W and 100 kHz), which was an improvement on Formulation 1 wherein all 3 W samples and the 4 W and 100 KHz samples showed poor plating. And since TiO2 showed no characteristics as a LDS additive when used alone, it was unexpected to see an improvement in plating performance when used in combination with an LDS additive. This improvement in the plating process window showed that TiO2 had a synergistic effect with an LDS additive to improve the characteristics of an LDS composition.

Figure 2:
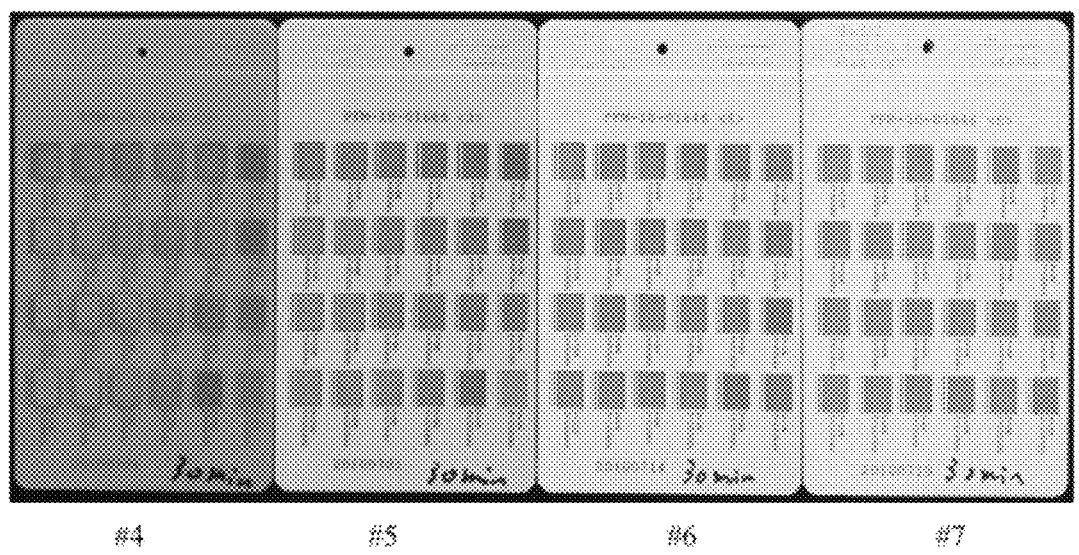
FIG. 2 shows examples of plating performance for compositions 4-7 in the Examples.

The impact of different loading levels of TiO2 was also evaluated using the formulations set shown in Table 2. As may be seen in FIG. 2, it was observed that 1% TiO2 could improve the metallization performance and as the amount of TiO2 was increased, the metallization performance improved. Table 3 shows that at 5% TiO2 loading, the improved plating performance can be achieved in Composition 6 without adversely affecting mechanical properties should these properties be desired.

TABLE 2

| Compositions | Unit | #4 | #5 | #6 | #7 |
|---|---|---|---|---|---|
| PC | Wt % | 49 | 48.5 | 46.5 | 44 |
| ABS | Wt % | 43.23 | 42.73 | 40.73 | 38.23 |
| Copper hydroxide phosphate | Wt % | 4 | 4 | 4 | 4 |
| Other fillers + additive | Wt % | 3.77 | 3.77 | 3.77 | 3.77 |
| TiO2 | Wt % | 0 | 1 | 5 | 10 |
| Total Weight | Wt % | 100 | 100 | 100 | 100 |

TABLE 3

| Compositions | Unit | #4 | #6 | Testing standard |
|---|---|---|---|---|
| MVR (260 C, 5 kg, 360 s) | cm$^3$/10 min | 15.8 | 22.7 | ASTM D1238 |
| Density | — | 1.155 | 1.201 | ASTM D 792 |
| Notched Impact | J/m | 464 | 380 | |
| Impact Ductility | % | 100 | 100 | ASTM D256 |
| HDT | | 95.6 | 95.2 | ASTM D 648 |

Figure 3:
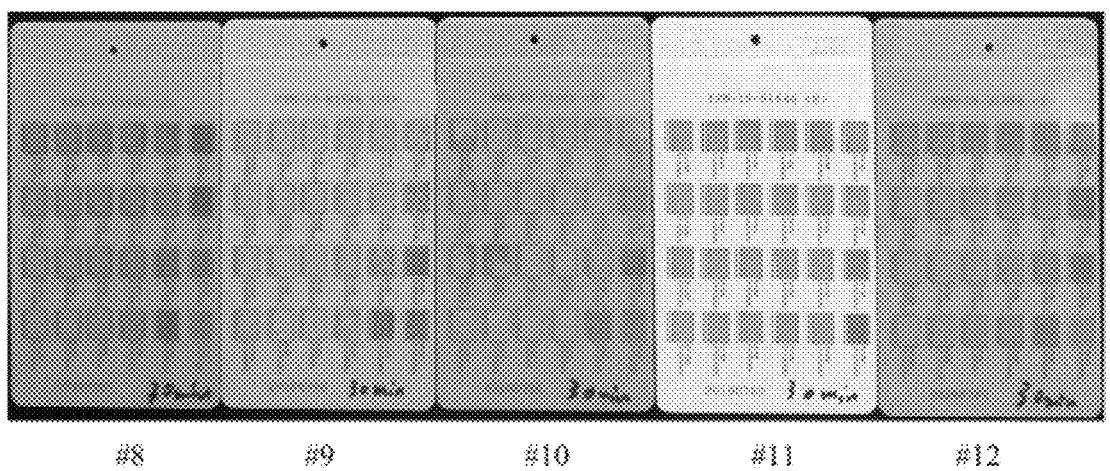
FIG. 3 shows examples of plating performance for compositions 8-12 in the Examples.

Lastly, it was shown that other pigments such as CaCO3, BaSO4, BaTiO3, and ZnO, all exhibited a synergistic effect with the laser activatable additive as well to improve the plating performance of the LDS compositions. Using the formulations described in Table 4, it was observed that there were bigger process windows in the case of each of these pigments than the control Sample. The results are seen in FIG. 3.

TABLE 4

| | | Compositions | | | | |
|---|---|---|---|---|---|---|
| | Unit | #8 | #9 | #10 | #11 | #12 |
| PC | Wt % | 49 | 44 | 44 | 44 | 44 |
| ABS | Wt % | 43.23 | 38.23 | 38.23 | 38.23 | 38.23 |
| Copper hydroxide phosphate | Wt % | 4 | 4 | 4 | 4 | 4 |
| Other fillers + additive | Wt % | 3.77 | 3.77 | 3.77 | 3.77 | 3.77 |
| ZnO | Wt % | | 10 | | | |
| BaSO4 | Wt % | | | 10 | | |
| BaTiO3 | Wt % | | | | 10 | |
| CaCO3 | Wt % | | | | | 10 |
| Total Weight | Wt % | 100 | 100 | 100 | 100 | 100 |

The copper layer was tested using the XRF method with ASTM B568 standard. In this standard, the laser power was 3 W, the laser pulse was 60 KHz, the laser speed was 2 m/s and the plating time was 30 min. In Table 5, the metal layer thickness were tested to show that the use of various white pigments increased the thickness of the metal layer compared to the composition with no white pigment, which indicate the white pigment can improve LDS performance. These examples were based on compositions 4-7 and 10-12 above.

Adhesion of the copper layer was determined by testing the peel strength using a peel test machine. The test method used was IPC-TM-650. In this standard, the laser power was 5 W, the laser pulse was 60 KHz, the laser speed was 2 m/s, the plated copper layer thickness was 30-35 um and the peel speed was 50 mm/min. In Table 5, the peel strengths were tested to show that the use of various white pigments have no negative effect on the peel strength in select embodiments. The peel strengths can still be in excess of 0.7N/mm. These examples were based on compositions 4-7 and 10-12 above

TABLE 5

| | Sample | | | | | | |
|---|---|---|---|---|---|---|---|
| | 4 | 5 | 6 | 7 | 10 | 11 | 12 |
| Pigment | None | 1% TiO2 | 5% TiO2 | 10% TiO2 | 10% BaSO4 | 10% BaTiO3 | 10% CaCO3 |
| Cu layer (microns) | 0.3 ± 0.1 | 0.9 ± 0.1 | 1.1 ± 0.1 | 2.3 ± 0.1 | 1.1 ± 0.1 | 2.0 ± 0.1 | 1.3 ± 0.1 |
| Peel strength (N/mm) | 0.82 | 0.89 | 0.82 | 1.00 | 0.85 | 0.70 | 0.81 |

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A thermoplastic composition, consisting essentially of:
   a) from 65 to 92% by weight of a thermoplastic base resin, wherein the thermoplastic base resin is selected from polycarbonate, a polycarbonate/acrylonitrile-butadiene-styrene resin blend; a poly(arylene ether) resin, a nylon-based resin, a polyphthalamide resin, a polyphenylene oxide resin or a combination including at least one of the foregoing resins;
   b) from 0.5 to 20% by weight of a laser direct structuring additive; and
   c) from 0.5 to 15% by weight of at least one pigment selected from $TiO_2$ including anatise, rutile, coated and uncoated, ZnO, $BaSO_4$, $CaCO_3$, $BaTiO_3$ or a combination including at least one of the foregoing pigments;
   wherein the thermoplastic composition is capable of being plated after being activated using a laser, wherein laser activation of the composition exposes metal atoms of the laser direct structuring additive such that metal seeds are formed on areas of the composition activated by the laser.

2. The thermoplastic composition of claim 1, wherein the laser direct structuring additive is selected from a heavy metal mixture oxide spinel, a copper salt, or a combination including at least one of the foregoing laser direct structuring additives.

3. A thermoplastic composition, consisting essentially of:
   a) from 70 to 90% by weight of a thermoplastic base resin, wherein the thermoplastic base resin is selected from polycarbonate, a polycarbonate/acrylonitrile-butadiene-styrene resin blend; a poly(arylene ether) resin, a nylon-based resin, a polyphthalamide resin, a polyphenylene oxide resin or a combination including at least one of the foregoing resins;
   b) from 1 to 10% by weight of a laser direct structuring additive selected from a heavy metal mixture oxide spinel, a copper salt, or a combination including at least one of the foregoing laser direct structuring additives; and
   c) from 1 to 10% by weight of at least one pigment selected from $TiO_2$ including anatise, rutile, coated and uncoated, ZnO, $BaSO_4$, $CaCO_3$, $BaTiO_3$ or a combination including at least one of the foregoing pigments;
   wherein the thermoplastic composition is capable of being plated after being activated using a laser, wherein laser activation of the composition exposes metal atoms of the laser direct structuring additive such that metal seeds are formed on areas of the composition activated by the laser.

* * * * *